OSCILLATOR AND SHOWER HEAD FOR USE THEREWITH

Original Filed Nov. 21, 1968 3 Sheets-Sheet 1

INVENTOR
PETER BAUER

BY Hurwitz, Rose & Greene

ATTORNEYS

OSCILLATOR AND SHOWER HEAD FOR USE THEREWITH

Original Filed Nov. 21, 1968 3 Sheets-Sheet 2

INVENTOR
PETER BAUER

BY Hurwitz, Rose + Greene

ATTORNEYS

OSCILLATOR AND SHOWER HEAD FOR USE THEREWITH
Original Filed Nov. 21, 1968 3 Sheets-Sheet 3
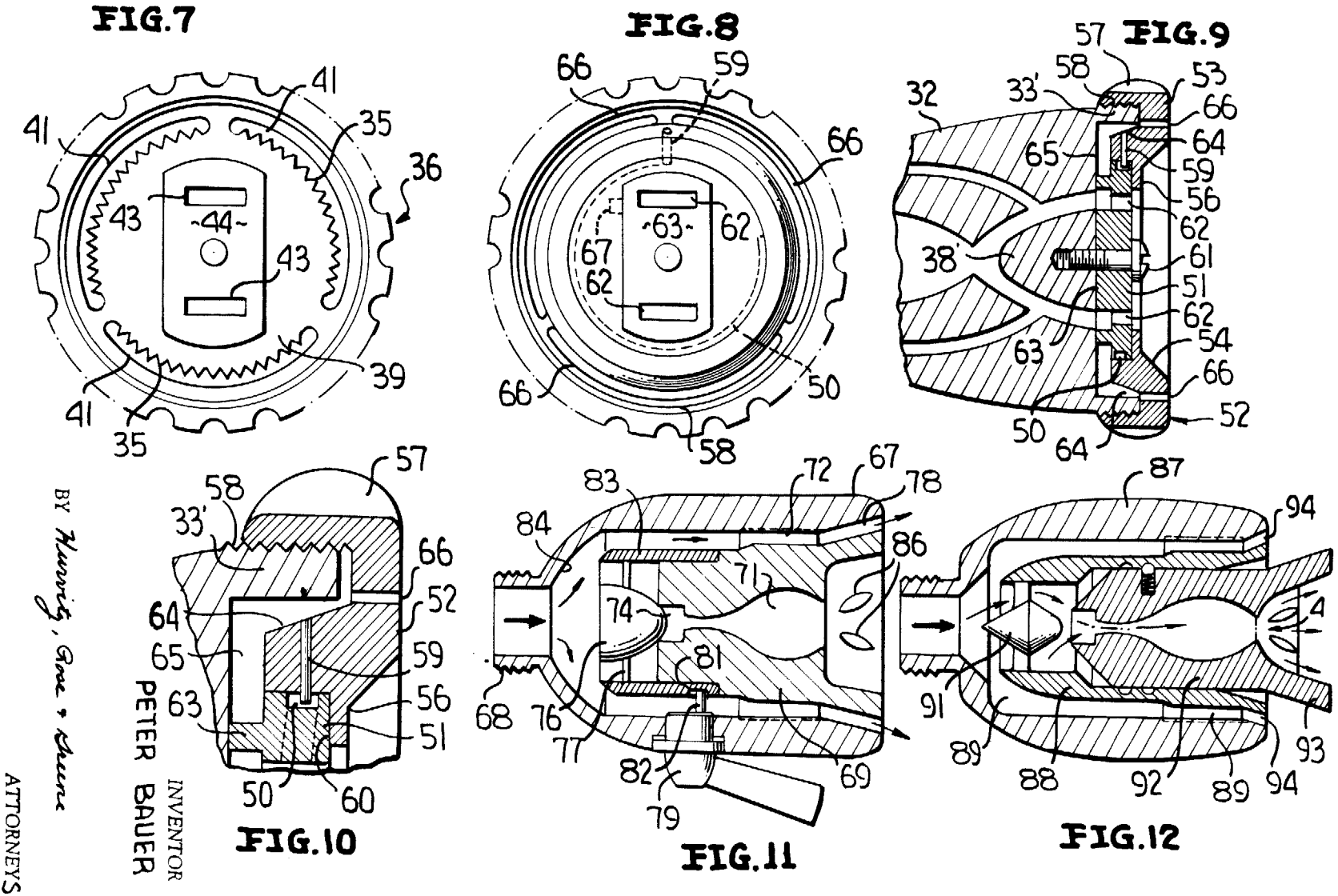
INVENTOR
PETER BAUER
BY Hurwitz, Rose & Greene
ATTORNEYS United States Patent Office Re. 27,938
Reissued Mar. 12, 1974

27,938
OSCILLATOR AND SHOWER HEAD FOR USE THEREWITH

Peter Bauer, Germantown, Md., assignor to Bowles Fluidics Corporation, Silver Spring, Md.

Original No. 3,563,462, dated Feb. 16, 1971, Ser. No. 777,694, Nov. 21, 1968. Application for reissue June 30, 1972, Ser. No. 268,212
Int. Cl. B05b *1/08*
U.S. Cl. 239—102 29 Claims

Matter enclosed in heavy brackets [ ] appears in the original patent but forms no part of this reissue specification; matter printed in italics indicates the additions made by reissue.

ABSTRACT OF THE DISCLOSURE

A gas-liquid fluidic oscillator is provided employing liquid as the operating fluid and gas as the control fluid, a pair of feedback channels to opposed central passages are provided, the liquid stream sealing one feedback channel while gas admitted to the other feedback channel[s] produces stream switching.

A shower head is also provided which may operate conventionally as a spray source or by rotation of a lever or a ring on the shower head or other suitable means may be converted to a source of fluid pulses generated by the oscillator located in the head to provide a fluidic massaging device.

BACKGROUND OF THE INVENTION

Fluidic oscillators of the type of interest herein employ feedback to accomplish stream switching, conventionally by feeding back a portion of the operating fluid to control nozzles to produce stream diversion in opposite senses. Where the operating fluid is a liquid, oscillators are usually quite slow and the oscillators must operate in a liquid environment thereby limiting their applicability. Such a limitation makes the use of such prior art oscillators impractical in applications where the operating fluid is liquid and the operating environment is gaseous, such as in a shower head.

Conventional shower heads provide the ability to change the intensity of flow of the water by varying the size of the streams issuing from the head. Different types of mechanisms are conventionally employed for accomplishing the above result, but regardless of the operating mechanism employed, the result is basically achieved by varying the size of the channels or orifices through which the water issues. In some instances this is accomplished by rotating a lever and in other instances the result is accomplished by rotating a ring disposed about the end of the head.

SUMMARY OF THE INVENTION

In accordance with the present invention there is provided a shower head which in many respects appears conventional, but which in fact, gives the user the ability to choose between a spray type or conventional head and a pulsating moving stream of water which has a massaging effect upon the body. Specifically, in the latter mode of operation, the stream of liquid moves between two extreme positions, maintaining the position at the two extremes for a time interval which is normally longer than the interval during which the stream is moving from one stream position to the other. The pulsating stream produces a massaging effect upon the body which has been found pleasing and invigorating to users of the device. In the embodiment of the device described above, the water impacts upon the body primarily at the two extremes of the deflection of the stream. By placing deflectors at appropriate locations within the shower head, the effect of the stream upon the body can be rendered more uniform, i.e., the body is swept by a dispersed moving stream. The operation of the unit as a pulsating or sweeping stream is determined by basic design parameters of the device.

Various mechanisms may be employed for converting the shower head of the present invention from one mode of operation to the other. The pulsating mode of operation is effected by means of a pure fluid oscillator formed in the shower head. In order to convert to a spray operation, water is either diverted prior to or after proceeding through the oscillator to a series of holes disposed about the end plate of the shower in a conventional manner. Conversion of the operation of the device may be affected by a slide, by a rotating ring or by a rotatable lever or simply by a push pull operation on the shower head itself.

As indicated above, the pulsating mode of operation of the shower head is achieved by a fluid oscillator. Various types of fluid oscillators may be employed but it has been found that given the size and cost limitations of a shower head and the desired frequency range, the oscillator of the present invention has been found to be the most practical for this and related applications.

It is an object of the present invention to provide a shower head having a first mode of operation providing a conventional spray of water and a second mode of operation providing an oscillating or pulsating stream of water.

It is another object of the present invention to provide a shower head which is readily convertible from one mode of operation to another, one mode of operation providing a pulsating or sweeping stream, and the other mode of operation providing a conventional water spray.

Still another object of the present invention is to provide a shower head having several modes of operation in which conversion from one mode of operation to another may be made simply and easily.

It is another object of the present invention to provide a multiple-mode-operation shower head which is economical to build and which is simple in operation.

Yet another object of the present invention is to provide a gas-liquid fluid oscillator employing gas feedback to effect stream switching.

Still another object of the present invention is to provide a gas-liquid oscillator in which a stream of liquid is switched between two extreme states, in each state the stream preventing gas from entering one of the two opposed feedback channels whereby gas flowing through the other of the feedback channels produces detachment from an adjacent sidewall, switching to the other sidewall thereafter being effected by appropriate shaping of a chamber located downstream of the sidewalls.

BRIEF DESCRIPTION OF THE DRAWINGS

The above and still further objects, features and advantages of the present invention will become apparent upon consideration of the following detailed description of several specific embodiments thereof, especially when taken in conjunction with the acompanying drawings, wherein:

FIG. 7 is a bottom view of the end ring of the apparatus of FIG. 6 of the accompanying drawings;

FIG. 8 of the acompanying drawings is a bottom view of an end ring or plate of a modification of the apparatus of FIGS. 5–7 which permits variation in the intensity of the spray of the water during conventional mode of operation;

FIG. 9 is a cross-sectional view in elevation of the apparatus of the ring of FIG. 8 of the accompanying drawings;

FIG. 10 is a partial sectional view of the apparatus of FIGS. 8 and 9 illustrating the different positions of certain parts to effect spray control;

FIG. 11 is a partial sectional view in elevation of a modification of FIG. 10 in which physical translation of the body is accomplished by an external lever;

FIG. 12 of the accompanying drawings is a partial sectional view in elevation of a still further embodiment of the invention in which conversion from one mode of operation to another is accomplished by manually translating a portion of the apparatus in order to selectively control flow to or divert flow from the power nozzle of a fluid oscillator;

DESCRIPTION OF THE PREFERRED EMBODIMENTS

Figure 1:
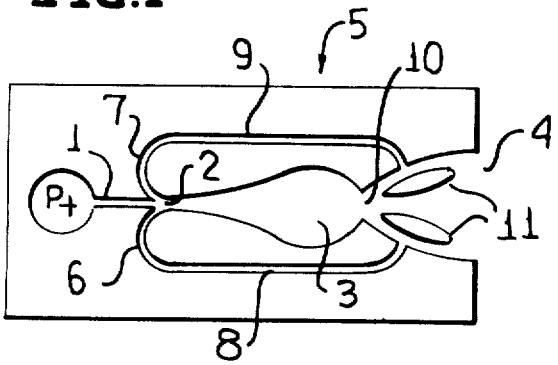
FIG. 1 is a cross-sectional diagrammatic view of an oscillator employed in the apparatus of the present invention.

Referring now specifically to FIG. 1 of the accompanying drawings, there is illustrated one form of oscillator which may be employed with the apparatus of the present invention. It is to be understood that other forms of fluidic oscillators may be employed and the specific type of oscillator illustrated and described is a preferred embodiment only.

The oscillator generally designated by the reference numeral 5 is provided with a powder nozzle 1 which directs a stream of fluid into an interaction region 2 and thence through an initially outwardly and then inwardly tapered region 3 which terminates in a throat 10 that opens into an outwardly tapering output region 4. The oscillator is provided with a pair of control nozzles 6 and 7 connected via feedback passages 8 and 9 to the lower and upper sides respectively (as viewed in FIG. 1) of the outwardly tapered enlarged region 4 downstream of the region 3.

In operation, fluid issued by the power nozzle 1 is initially directed centrally of the interaction region 2 and fills the region or chamber 3 with a mixture of fluid, fluid spray, and entrained air bubbles, whilst some fluid exits from region 3 into region 4. The fluid stream issuing from the power nozzle 1 (its momentum and velocity), and the resulting mixture of fluid, fluid spray, and air bubbles, which moves from region 2 through region 3 into region 4, tends to become biased due to stream perturbations closer to the lower or the upper wall of region 3. The biased fluid mixture flow tends to follow, for instance, the lower wall of region 3, and is injected into region 4 tending toward the upper wall thereof. The fluid flow passing by the control nozzles 6 and 7 in region 2 strongly aspirates these control nozzles and the connected feedback channels 8 and 9. The biased fluid mixture flow injected into region 4 tending toward the upper wall thereof is aspirated into the feedback channel 9 and flows back through this channel and through control nozzle 7 into region 2, whilst only air is aspirated through the feedback channel 8 and control nozzle 6 into region 2 on the lower side of the fluid power stream issued by the power nozzle 1. Since volumetric flow of air due to the aspiration through control nozzle 6 is much greater than the volumetric flow of fluid mixture throuh control nozzle 7, the upper side of the power stream in region 2 experiences a lower pressure than the lower side, which in turn causes the power stream to attach to the upper wall of region 2 and to follow the upper wall of the region 3 so that the stream is now diverted to the lower wall of the region 4.

The above operation is aided and enhanced by a small portion of the stream in region 3 *being peeled off and returned into region 3* by the cusp at the exit throat 10 from region 3 into region 4. The returned stream portion circulates within region 3 in clockwise direction in the above example, thus providing a positive feedback to hold the power stream to the upper wall. This feedback flow also effects a closure of the region 3 exit against external air which might otherwise enter from the only partially fluid filled region 4 into region 3 and which might interfere with the correct and desired oscillator operation.

The power stream diversion to the lower wall of region 4 seals the entry to passage 8 so that volumetric flow therethrough is less than through passage 9 and the stream in the region 2 is again switched to the upper wall.

In the above manner, the stream is caused to switch back and forth between the upper and lower walls of the region 4 at a rate determined by the time delay in the circuitry, which is proportional to the fluid flow velocity in the channels, whereby the power stream flow velocity provides the forward time delay from region 2 to region 4 and the feedback flow velocity provides the feedback time delay from region 4 to region 2. The latter velocity is a function of the pressure difference between feedback channel entry in region 4 and the feedback control nozzle in region 2. Since the pressures in both these positions are given by the amount of aspiration, whereby aspiration in region 2 is always stronger than in region 4, the time delay and therefore the oscillator frequency can be varied, not only by channel length and power stream velocity changes, but also by configuration changes in region 2 and 4. Especially changes of shape and direction of the feedback channel entries in region 4 can provide large changes in pressure at these locations, as can be readily visualized from FIG. 1, where, in the extreme, one could scoop out flow by the feedback channel entry and obtain in a high pressure (and thus a small feedback delay) or where one could strongly aspirate by means of leading the feedback channel almost tangentially into region 4 (and thus obtain a low pressure and a large delay). The angle of entry of the feedback channel into region 4 is limited in the case of scooping off fluid, since if the angle is too great, feedback pressure of the liquid predominates and the fluid stream is switched to one wall of region 3 and cannot thereafter be switched.

As described, the water is switched back and forth between the upper and lower walls and provides an oscillating stream, producing a massaging effect on the body when the stream is directed against the user.

In the region 4 there may be located two small islands 11 which may be employed to diffuse the streams so as, if desired, to reduce the pulsating effect and to cause the water to provide a more constant flow versus position of the stream across the mouth of the region 4. The islands 11 may or may not be added depending upon the final effect desired from the apparatus. The oscillator may be formed as a flat device, that is, each of the channels is rectangular in cross section, the channels of the oscillator having a depth depending upon the quantity of water desired to be issued under specified water pressure conditions.

Figure 2:
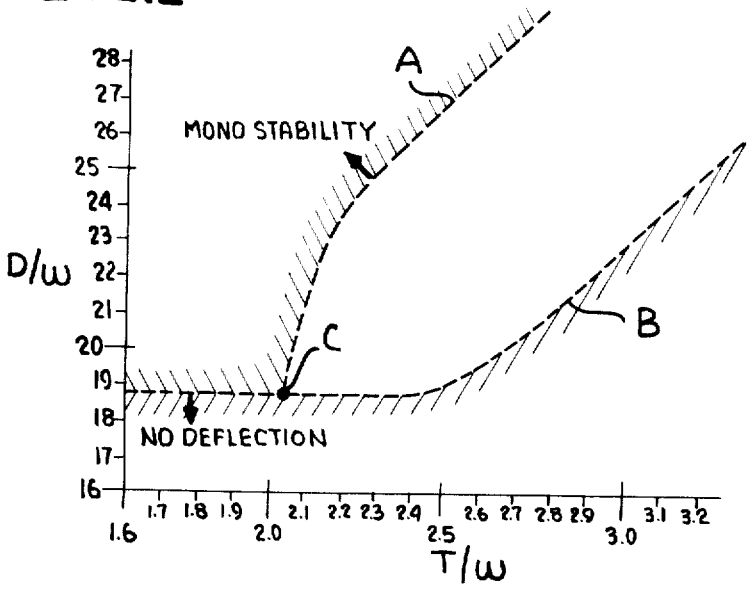
FIG. 2 is a graph illustrating the interrelationship between various dimensions of the oscillator of FIG. 1 necessary to produce the oscillatory effect.

Certain parameters of the oscillator are critical and reference is made to the graph of FIG. 2 for a description of these parameters. In referring to the graph D, W and T stand for distance from the power nozzle exit to the throat 10, the width of the power nozzle and the width of the throat 10, respectively. The dimensions D and T have been standardized with respect to the power nozzle width, W.

The graph provides a region defined by lines A and B emanating from the point C which region delimits on three sides the operating region of the oscillator. If the aforesaid dimensions of the oscillator fall above the operating region or about a line drawn parallel to the T/W axis from the point C, the device is monostable. If, however, the dimensions of the oscillator are such that they fall below the operation region on the aforesaid line, the power stream is undeflected.

Over a large part of their length the lines A and B are parallel having a slope of roughly 10. As the lines approach the point C they converge, starting at about 2.4 on the T/W scale, intersecting at about 2 on the T/W scale and about 19 on the D/W scale.

Figure 3:
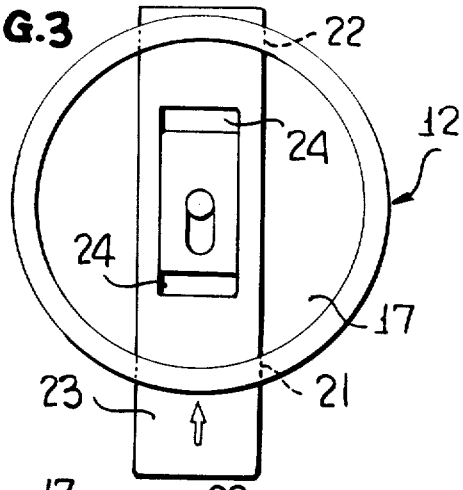
FIG. 3 is an end view of an embodiment of the invention utilizing a slide to control conversion of the shower head from one mode of operation to the other.
Figure 4:
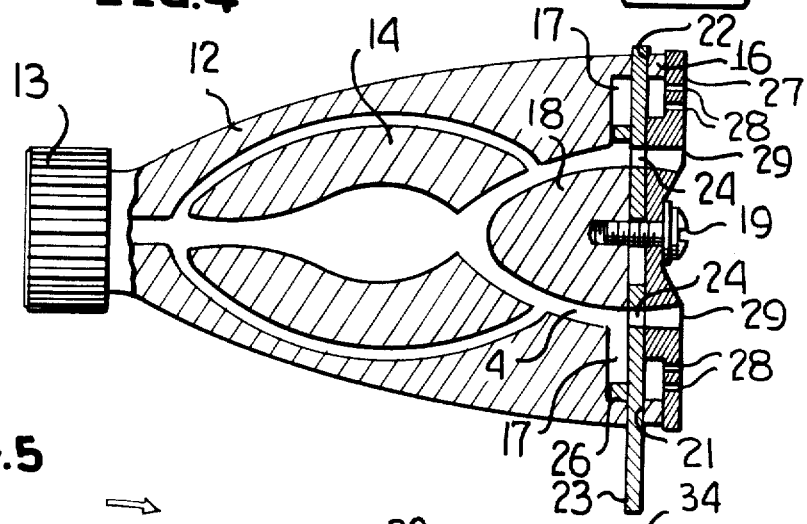
FIG. 4 is a side view section of the shower heat of FIG. 3.

Referring now specifically to FIGS. 3 and 4 of the accompanying drawings there is illustrated a shower head 12 having an internally threaded nut 13 for connecting the shower head to an outlet pipe of the plumbing system to which the head is to be connected. The shower head 12 may be externally conventional in design tapering outwardly in a generally conical arrangement. Secured internally of the shower head is a fluidic oscillator 14 which may be of the design illustrated in FIG. 1. In actual practice the shower head may be fabricated from molded plastic with the oscillator 14 formed by channels in the mating faces of the mold halves. The shower head 12 terminates at its water emitting end or at the right end, as illustrated in FIG. 4, in an annular shoulder 16 which defines a recessed region 17 interiorly thereof.

The output region 4 of the oscillator 14 has arranged interiorly thereof a generally outwardly diverging member 18 having a rounded left or smaller end as viewed in FIG. 4, to which various parts of the head, to be described subsequently, may be secured as by means of a bolt 19. The annulus 16 is slotted at the regions defined by reference numerals 21 and 22 in FIG. 4 to receive a slide 23 having two generally rectangular passages 24 therethrough. The slide carries a pair of stop pins 24 and 26 on its left surface, as viewed in FIG. 4, which engage the annulus 16 so as to limit the translating movement of the slide.

In the position of the slide illustrated in both FIGS. 3 and 4, the slots 24 are aligned with the exit passages of the region 4 so that in this position, water proceeding through the oscillator passes through the slide to be projected against the body of the user.

If the slide is moved upwardly, as illustrated in FIGS. 3 and 4, the passages 24 are no longer aligned with the region 4 so that the water proceeding through the oscillator contacts a solid surface of the slide and is diverted into the recessed region 17 of the shower head 12 which is defined by the annulus 16. Specifically, the slide 23 is disposed above the bottom surface of the recessed region 17 so that water may flow around the slide when the passages 24 are not aligned with the region 4 of the oscillator. The shower head is provided with an end plate 27 having a plurality of small holes or apertures 28 proceeding therethrough in the direction of travel of the water. Water diverted by the slide 23, when its apertures 24 are not aligned with the output passages of the oscillator, flows around the slide and through the apertures 28 and is directed as a spray toward the body of the user.

In operation when the user wishes to use the oscillating effect of the shower head, the slide 23 is positioned as illustrated in FIGS. 3 and 4, and when the shower is turned on, the oscillator 14 causes the water to switch alternately between the upper and lower portions of the region 4 and to flow around the member 18 and through apertures 24 in the slide 23 and through corresponding apertures 29 in the end plate 27. When it is desired to employ a conventional spray, the slide 23 is moved upwardly in FIGS. 3 and 4, blocking flow through the slide and causing the water to divert into the region 17 and through the holes 28 formed in the plate 27, at the same time sealing off apertures 29 in the end plate 27 by means of a rectangular shaped block 30 extending from the left of the end plate 27 into engagement with slide 23 and completely enclosing the apertures 29.

Figure 5:
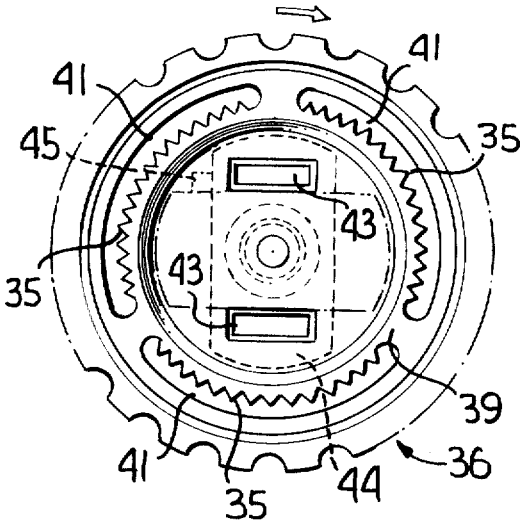
FIG. 5 is an end view of a shower head which may be converted from one mode of operation to the other by rotation of a ring at the end of the shower head.
Figure 6:
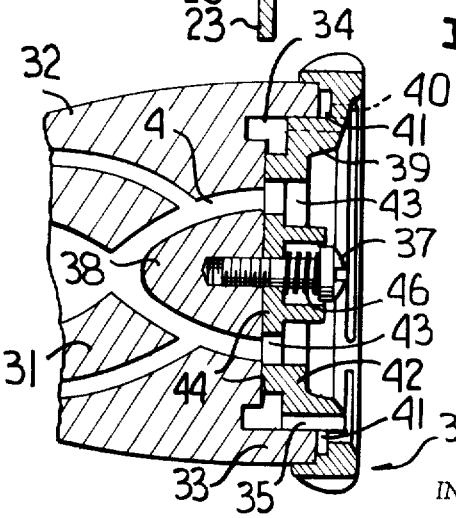
FIG. 6 is a side view in partial section of the shower head of FIG. 5.

Referring now specifically to FIGS. 5, 6 and 7 of the accompanying drawings, there is illustrated another embodiment of the invention in which the slide of the prior embodiment is eliminated and the same function obtained by means of a rotatable ring, i.e. conversion of one mode of operation to another may be obtained by rotating the end plate of the device. The shower head again may be formed from mirror-imaged pieces of molded or cast plastic or metal to provide an oscillator 31 formed as an integral part of a shower head body 32. The shower head again terminates in its right end in an annulus 33 defining a recessed region 34 in the end of the head. A unitary end plate or member 36 is provided and is secured to the head 32 by means of a screw 37 which threads into an integrally-molded member 38 of the head 32.

The member 38 again defines two specific passages in the region 4 of the oscillator. The end member 36 is formed with a flat region 40 lying generally perpendicular to the axis of symmetry of the oscillator and therefore of the head 32. The region 40 terminates in an inwardly extending annular wall 39 which is generally parallel to the axis of the oscillator. The annular wall 39 of the end member 36 abuts the inner circumference of the annular wall 33 and is provided with axially extending serrations 35 to permit water to pass between the two surfaces and to produce multiple streams so as to provide a spray effect. The region 40 of the plate 36 is provided with a plurality of arcuate apertures 41 through which water may pass to define a shower spray or spray of water when the apparatus is to be operated in the spray mode.

The hollow cylindrical wall 39 of the member 36 terminates in a further wall 42 which is again perpendicular to the center line of the head. The wall 42 is provided with two rectangular apertures 43 which, when the apparatus is in the pulsating mode of operation, are aligned with the output passages of the region 4 of the oscillator. The apertures 43 extend through a generally rectangular block 44 which projects from the left surface of the end plate 36 and seats against the right end surface of the recessed region 34 of the body 32 to provide a fluid seal therebetween. As previously indicated, the plate 36 is biased against the body 32 by a screw 37 which passes through the wall 42 in the region between the two rectangular apertures 43 and a spring 46 against which the head of the screw 37 passes.

In operation, with the plate 36 in the position illustrated in FIGS. 5 and 6, the apertures 43 which extend through the block 44, are aligned with the passages of the region 4 of the oscillator (alignment being assured by a stop 45 in FIG. 4 extending to the right from the left end surface of the body 32 in FIG. 5), and fluid is emitted in pulses from first the one and then the other passage and [are] *is* directed toward the body of the user. The end plate 36 may be rotated so as to move the apertures 43 out of alignment with the passages of the region 4 in which case the fluid being emitted from these passages is directed against the recessed or solid part of the block 44 of the plate 36. The water now flows through the region 34 and through the serrations lying between the inner and outer surfaces of the walls 33 and 39 respectively and is projected through the slotted apertures 41 of the plate 36 toward the body of the user.

The end plate 36 of the shower head may be readily rotated since the screw 37 presses against the spring 46 to provide a spring bias force against the member 36 to maintain engagement with the right end surface of the body 32.

Referring specifically to FIGS. 8 through 10 of the accompanying drawings, there is illustrated a further modification of the present invention in which the flow of the water during the spray mode of operation may be varied or adjusted in accordance with the desires of the user. This embodiment of the invention is basically a modification of the apparatus of FIGS. 5 through 7 hereof. In the present embodiment of the invention there is provided a flat, disclike member 51 secured, by means of a bolt 61, to a body member 38' which is substantially identical with the body member 38 of FIG. 5. The edge of the plate 51 is provided with a helical slot or screw thread 50 which extends about the periphery of the plate through approximately 270° of the plate. The number of degrees is not intended to be limiting and may be varied as will become apparent subsequently. The apparatus is again with an end plate 52 have a flat region 53 generally perpendicular to the centerline of the oscillator, a generally cylindrical but inwardly tapered, region 54 generally parallel to the centerline of the apparatus and another flat region 56 again generally perpendicular to the centerline of the apparatus. The outer edge of the region 53 of the end plate 52 terminates in an annulus 57 of sufficient diameter to extend about the outer periphery of the body 32 of the shower head. The inner cylindrical surface of the annulus 57 is threaded so as to engage threads on the exterior surface of the annulus 33' of the shower body so that the plate 52 may be screwed onto the end of the shower head and thereafter rotated so as to cause the plate 52 to translate parallel to the axis of the body. The threadedly engaged regions of the plate 52 and of the body 33' are generally designated by the reference numeral 58.

The region 56 of the end plate 52 is provided with a cylindrical recess 60 in its left side as illustrated in FIG. 10, to receive the circular plate 51. A pin 59 is inserted through the unrecessed part of the region 56 of the plate 52 and extends into the threads or helix 50 formed in the edge of the plate 51. The pitch of the thread 50 is the same as that of the threads 58 in the walls of the members 33' and 39 for reasons to be apparent subsequently, and the axial width of the slot of the thread 50 is at least the tangent of the helix angle times the circumferential length corresponding to 90° of plate 51 plus the pin diameter. This width permits axial translation of the pin 50 when the plate 51 is rotating with the pin.

The plate 51 is centrally apertured to receive a screw 61 which is threaded into the member 38' to retain the plate 52 against the body 38. A spring may be interposed between the head of the screw and the plate to facilitate adjustment of the holding force on the plate.

The plate 51 is rotated when the pin 59, upon rotation of the plate 52 by the user, engages one or the other end of the thread 50 formed in the edge of the plate 51. The plate 51 is provided with apertures 62 which are aligned with the channels of the region 4 of the oscillator in the pulsating mode of operation. By rotation of the plate 51, the pin may be caused to traverse to the other end of the discontinuous thread 50 and further rotation of the member 52 causes the plate 51 to rotate so that the apertures 62 become misaligned relative to the output channels of the oscillator. The wide slot or helix 50 permits the pin to move axially in the slot at this time.

The left surface of the plate 51 is again provided with a rectangular block 63 (see FIG. 8) through which the apertures 62 extend so that when the ring 51 is rotated to produce misalignment of the apertures 62 and the oscillator channels, the output passages of the oscillator feed a region 65 existing between the plate 51 and the vertical right hand face of the body 32 as viewed in FIG. 9. The water now disperses into the region between the wall 54 of the end member 52 and the inner wall of the annulus 33' of the shower head.

Formed on the outer periphery of the wall 54 of the member 52, is conical surface 64 through which the water may pass between the member 33' and the wall 54 of the plate 52. Upon rotation of the plate 52, it is translated due to the threads 58 to the left and right depending upon the direction of rotation. Translation of member 52 causes the opening between the member 54 and the inner wall of the annulus 33' to become larger and smaller depending upon the direction of displacement of the member 52. If the ring is rotated so that it is moved a maximum distance to the right, as illustrated in FIG. 11, the spacing between the inner wall of the annulus 33' and the conical wall 64 is at its maximum distance. If the ring is rotated in the opposite direction so that the ring 52 is moved its maximum displacement to the left, as illustrated in FIG. 9, the distance between the wall of 33' and the wall of the cone 64 is narrowed. Consequently, the quantity of flow through these regions, is determined by the position of the plate 52 relative to the body of the shower head.

Aligned with the region between the inner wall of annulus 33' of the shower head and the cone 64 in the wall member 54 of the end member 52 are a plurality of circumferential holes 66 through which the water is projected.

In use if it is washed to employ the shower head in the oscillating mode, the plate 51 is positioned as illustrated in FIG. 9. When it is desired to change the mode of operation, the member 52 is rotated until the pin 59 engages the end of the thread or slot 50 formed on the edge of the plate 51 so that continued rotation of the member 52 causes the plate 51 to rotate until the apertures 62 are misaligned with the output channels of the oscillator. When it is desired to convert back to the oscillating mode of operation, the member 52 is again rotated until the pin 59 engages the other end of the slotted thread 50 so that continued rotation of the member 52 rotates the plate 51 until the slots 62 become aligned with the output channels of the oscillator. About a 90° rotation of the plate 51 has been found adequate to seal the passages 62, although other degrees of rotation may be employed depending primarily on the circumferences of the head and the width of the head and the width of the slots. The plate 52 may, after connecting the unit to the spray mode, be rotated in the opposite direction to cause the members 52 to translate parallel to the axis of the oscillator and thereby change the spray effect from the shower head.

In order to provide precise alignment of the passages 62 with the output channels of the oscillator an aligning pin 67 may be provided which is seated in the vertical end surface of the body 32 so that when the passages 62 are aligned with the output channels of the oscillator, the pin 67 engages an edge of the block 63 and maintains the proper alignment between the various parts.

Referring now specifically to FIG. 11 of the accompanying drawings, there is illustrated an embodiment of the invention which differs from each of the prior embodiments in that when it is desired to switch from the oscillatory mode of operation to a spray mode, the oscillator is disabled and the fluid is diverted directly to the spray apertures of the head [rather than first preceding through the oscillator and then being diverted directly to the spray apertures of the head] rather than first preceding through the oscillator and then being diverted to the spray forming regions. The shower head comprises a generally hollow cylindrical body 67 having an inwardly tapered region terminating at the left end as viewed in FIG. 11, in a threaded member 68 of a diameter to accept a nut fitting on the end of a conventional plumbing pipe. Arranged interiorly of the body is generally solid member 69 having a fluidic oscillator 71 formed therein. The body 69 is provided with a series of peripherally arranged axially extending vanes 72 which contact the interior surface of the body 67. The oscillator terminates at its left end in a power nozzle 73 which terminates at its left end in a recessed region 74 formed in the left end of the body 69. The recessed region 74 is disposed opposite a domed member 76 carried on a spider 77 formed, for instance, integrally with an annular slide 83 seated in a recessed annular region 80 in the body 67. Downstream of the vanes 72, the body 69 is provided with a plurality of flutes or slots 78 to provide a spray of water when the device is operated in the spray mode.

As viewed in FIG. 11, a lever mechanism 79 enters through the body 67 from the bottom thereof. The lever mechanism is rotatable in the body 67 and carries on its interior end an eccentric or pin 81. The pin 81 engages a recess 82 formed in the lower surface of the slide 83.

In the position illustrated in FIG. 11, the slide 83 is in its rightmost position with the dome-shaped members 76 seated against the end of body 69 so as to seal the entry to the oscillator power nozzle 73. Under these circumstances water entering the hollow left end of the body 67 cannot enter the power nozzle 73 and is diverted into a region between the bodies 67 and 69 and is expelled through the slots 78 subsisting between the bodies 67 and 79 at the right end of the shower head, to produce a water spray. When it is wished to produce a pulsating flow from the shower head, that is, cause the water to proceed through the oscillator, the lever mechanism 79 is rotated a specified number of degrees and the slide 83 is translated to the right as viewed in FIG. 11. The dome 76 is thus moved away from the body 69 and the left end of the slide 83 is seated against interior wall 84 of the body 67 to said passages 72 against entry of water. Water entering through the left end of the hallow shower head 67 is now constrained to proceed through the opening between the left end of the body 69 and the dome 76 and into the power nozzle 73 of the oscillator.

The oscillator may be provided with deflector vanes 86 for the same purpose that the vanes 11 are provided in FIG. 1; that is, to produce a more uniform distribution of the water in proceeding from one side of the oscillator to the other.

Referring now specifically to FIG. 12 of the accompanying drawings, there is illustrated a shower head comprising a hollow outer body 87 having a hollow sleeve 88 spaced interiorly thereof to provide an annular passage 89 therebetween. The sleeve 88 is supported interiorly of the body by outwardly extending vanes 89 which engage the interior surface of the body 87. A dome shaped member 91 is carried on a spider interiorly of the sleeve 88 adjacent its left end.

An oscillator body 92 is slidably received in the sleeve 88 and has an input passage 93 to the oscillator carried adjacent the left end of the body 92 in alignment with the domed member 91. The right end of body 92 is provided with an outwardly flaring annulus which may be gripped by the hand of the user to axially translate the body 92. When the body 92 is in its left position, the entrance to the oscillator is sealed and water is diverted to channels 89 and issues through apertures 94. When the body is moved right, as viewed in FIG. 12, water enters the oscillator and pulsating flow issues from the region 4 of the oscillator.

It should be noted relative to FIG. 12, that the adjacent surfaces of the members 88 and 92 may be threaded, so that control of the position of the body 92 may be varied by rotation thereof.

Figure 14:
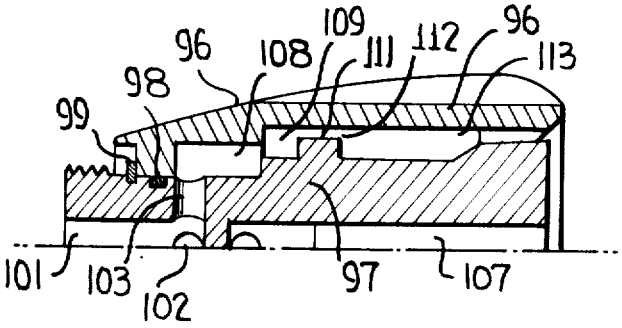
FIG. 14 is a partial view in cross section with parts rotated about 30° relative to FIG. 13.
Figure 13:
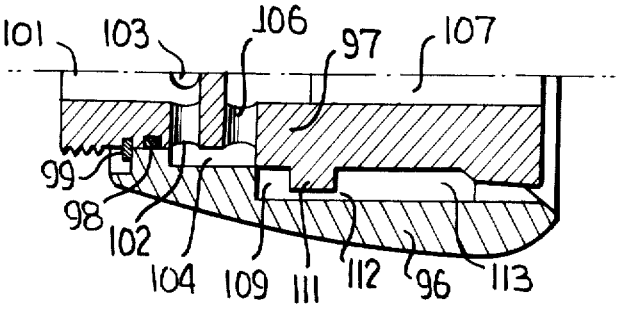
FIG. 13 is a partial view in cross section of a further embodiment of the invention.

Referring specifically to FIGS. 13 and 14 of the accompanying drawings, there is illustrated a version of the shower head having a total of only 4 parts including an O-ring and a retainer ring.

The apparatus includes a hollow outer body 96, an inner oscillator body 97, an O-ring seal 98 between bodies 96 and 97 and a retainer ring 99 to prevent movement of the oscillator body 97 to the right, as viewed in FIGS. 13 and 14, relative to outer body 96. The body 97 is connected to the water supply and the body 96 is rotatable about the body 97.

The oscillator body 97 has an axial entry passage 101 which terminates in cross arm passages 102 and 103. When the body 96 is in the position illustrated in FIG. 13, relative to body 97, passage 102 registers with recesses 104 in body 96 which extends into communication with a further passage 106 in the body 97. The passage 106 communicates with a fluid oscillator 107 and fluid entering passage 101 is directed outwardly through both ends of passage 102 to recesses 104 to both ends of passage 106 to the oscillator. The recesses 104 have an arcuate length about the same as the passages 102 and 106, a few degrees.

When the body 96 is in the position illustrated in FIG. 14, relative to body 96, a rotation of about 30° relative to FIG. 13, the two ends of the cross passage 103 are aligned with recesses 108 in body 96 while the passage 102 is out of alignment with recesses 104 and are sealed against a solid wall of body 96. The recesses 108 have an arcuate length of only a few degrees but open into an annular chamber 109 between the members 96 and 97. An annular projection 111 from body 97 defines a restricted flow path 112 between the bodies so as to uniformly pressurize the region 109.

The restricted flow path 112 enters a further annular chamber 113 which terminates in a plurality of holes 114 to define spray of water.

If the body 96 is rotated another 30° all passages 102 and 103 are sealed. If the, for instance, oscillator body 97 is made of a softer material then the body 96 and a tight fit is provided therebetween, the shower head may serve as its own shutoff valve. In this case, only a mixing chamber is required for use with the head.

Although the apparatus of the present invention has been described in conjunction with a shower head it is not intended to limit the utility of the device to one particular use. It is known that a pulsating stream of water has the ability to move, for instance, dirt or debris, far more efficiently than a continuous stream of water. Thus in cleaning driveways and sidewalks the principles of the present invention may be employed for a nozzle for use on the end of a hose. Similar problems arise in industrial uses particularly in the field of agitation of materials and objects.

The oscillator of FIG. 1 is described as a planar device. It should be noted that the oscillator may be three dimensional and specifically could have the geometric configuration generated by rotating an axis parallel to the two dimensioinal diagram of FIG. 1 about an axis parallel to its longitudinal centerline for instance, about the lower edge of the body 5. Such a device produces an annular liquid stream which expands and contracts in diameter. Such a device is of great use in agitation since the quantities of liquid supplied are quite large and thus the power supplied is great.

While I have described and illustrated several specific embodiments of my invention, it will be clear that variations of the details of construction which are specifically illustrated and described may be resorted to without departing from the true spirit and scope of the invention as defined in the appended claims.

I claim:

1. In combination:

(a) a body having a first output region and a second output region, one of said output regions being disposed around the other of said output regions;

(b) said body including a device for producing oscillatory lateral deflection of fluid flow upon application of a pressurized fluid thereto;

(c) said device having an output region capable of delivering to said first output region of said body said fluid having an oscillatory lateral deflection;

(d) said body having at least one passage terminating in said second output region, said second output region having a plurality of small fluid passages;

(e) selectively operable means having a first position and a second position;

(f) said means in said first position being arranged to *cause* [direct fluid to said device to issue] oscillatory fluid *to issue from said device* through said first output region of said body; and (g) said means in said second position being arranged to cause fluid to issue through said plurality of small apertures in said second output region of said body.

2. The combination according to claim 1: wherein said device is a pure fluid oscillator for laterally oscillating a stream between two extreme positions.

3. The combination according to claim 1:
(a) wherein said device has an input passage for receiving fluid under pressure;
(b) wherein said body is provided with a passage for delivering substantially all of said fluid supplied to said body to said input passage of said device; and
(c) wherein said selectively operable means in said second position diverts fluid issuing from said device to said at least one passage of said body.

4. The combination according to claim 3:
(a) wherein said selectively operable means comprises;
(b) a member having at least one aperture therethrough;
(c) said member being movable between a first and a second position;
(d) said aperture in said member being positioned in line in the directions of flow of fluid from said device when said member is in said first position;
(e) said member having a wall presenting a solid barrier along the direction of flow of fluid from said device when said member is in said second position; and
(f) wherein said at least one passage extends from a region between said output region of said device and said member and said plurality of small fluid passages.

5. The combination according to claim 4:
(a) wherein said member is a slide having a region at each end thereof extending outwardly from said body; and
(b) wherein said body has channel means formed therein for slideably receiving said slide.

6. The combination according to claim 4:
(a) wherein said member is an end plate;
(b) wherein means are provided for rotably securing said end plate to said body;
(c) said end plate having formed therein a plurality of passages communicating with said at least one passage in said body; and
(d) said end plate having passage means in line with said output region of said device.

7. The combination according to claim 1:
(a) wherein said selectively operable means in said second position comprises further operable means for varying the cross-sectional area of said small fluid passages.

8. The combination according to claim 2:
(a) comprising deflector means disposed in said first output region of said body for rendering the flow of fluid through said region more uniform between said two extreme positions than in the absence of said means.

9. The combination according to claim 1:
(a) wherein said device has an input passage for receiving fluid under pressure;
(b) wherein said body is provided with an input passage for receiving fluid under pressure; and
(c) wherein said selectively operable means in said first position directs the pressurized fluid to said input passage of said device and in said second position directs the fluid under pressure in said input passage of said body only to said at least one passage in said body.

10. The combination according to claim 9:
(a) further comprising means for mounting said device in said body for at least translatory movement;
(b) said selectively operable means adapated to translate said device between a first and a second position.
(c) means adapted to seal said input passage of said device and divert fluid to said at least one passage when said means is in said second position; and
(d) means adapted to direct fluid to said input passage of said device when said means is in said first position.

11. The combination according to claim 10:
(a) wherein said selectively operable means is a lever;
(b) said lever rotatably about a centerline and having an eccentric member in engagement with said device.

12. The combination according to claim 10:
(a) wherein said device is slidably received in said body; and
(b) means adapted to be engaged by the hand of the user to translate said device.

13. The combination according to claim 10:
(a) wherein said device is in threaded engagement with said body; and
(b) wherein said device is provided with a hand engageable member whereby translation of said device relative to said body is affected by rotation of said device.

14. The combination according to claim 10:
(a) wherein there is provided in said body a hollow region between said input passages of said body a said device;
(b) said region having an outwardly flared interior wall having predetermined angle such that said fluid flows as a solid stream to said input passage in the absence of back pressure in said region, and said stream attaches to said flared wall in the presence of back pressure in said region due to sealing of said input passage to said device.

15. The combination according to claim 10:
(a) wherein there is provided in said body a hollow region between said input passages of said body a said device;
(b) an annular wall extending from the outer periphery of said device toward said input passage of said body to define a region upstream of said input passage to said device in which pressurized fluid egressing from said input passage of said body may be collected and at least partially confined.

16. The combination according to claim 9 wherein said selectively operable means comprises:
(a) an outer part of said body arranged for rotation about the remainder of said body;
(b) said outer part having in a first rotational position, first passage means interconnecting said input passages; and
(c) said outer part having in a second rotational position, second passage means interconnecting said input passage of said body and said at least one passage and means for blocking flow between said input passages.

17. The combination according to claim 16 wherein said outer part includes means for blocking all output flow from said input passage of said body in a third position of said outer part.

18. A gas-liquid fluidic oscillator comprising:
(a) a power nozzle for issuing a power stream of liquid;
(b) a chamber generally symmetrical with respect to the centerline of said power nozzle and having a narrow entry region at one end and a throat region at the other end of said chamber;
(c) an interaction region lying between said nozzle and said entry region of said chamber;
(d) said chamber having continuous wall diverging outwardly at a small angle from said narrow entry region and converging at a relatively sharp curved angle to said throat region;
(e) a pair of control passages opening into said interaction region from opposite sides thereof;
(f) an output region extending from immediately downstream of said throat region into a gaseous region;
(g) said output region having outwardly extending walls;
(h) a pair of feedback channels each extending between a different control pasage and said output region through opposed locations in said walls of said output region;

(i) said chamber and said region having contours such that the power stream flows over the ends of said feedback channels entering said output region each in turn, such as to prevent entry of gas therein; and (j) said passages entering said output region at an angle such that the pressure in the interaction region on one side of said stream resulting from feedback of operating fluid through one of said channels is less than the pressure on the other side of the power stream resulting from the feedback of ambient gas in said output region through the other of said feedback passages.

19. The combination according to claim 18 wherein the interrelationship of dimensions of the width, W, of said power nozzle, the distance, D, from said power nozzle to said throat region and the width, T, of the throat region, are such as to lie within the lines A and B of the graph of FIG. 2 of the accompanying drawings.

20. A gas-liquid oscillator comprising:

(a) a power nozzle for issuing a power stream of liquid;

(b) an output region having walls diverging outwardly from an upstream to a downstream region;

(c) an interaction region lying between said nozzle and said output region;

(d) a pair of control passages entering from opposite sides of said interaction region adjacent said power nozzle;

(e) a pair of feedback channels each extending from a different wall of said output region to a different one of said control passages;

(f) means for directing fluid of said stream from said interaction region to said output region such that the stream of fluid flows selectively over one and the other of said walls of said output region to seal the entry of first one and then the other of said feedback passages into said output region against entry of gas thereinto; and (g) said output region opening into a gaseous region at its downstream end and having a centrally located body defining with said walls a pair of discrete output passages.

21. A gas-liquid oscillator comprising:

(a) a fluidic flip-flop having sidewalls defining an interaction region, a pair of control passages entering said interaction region through said sidewalls from opposite sides thereof and a power nozzle for issuing a stream of liquid through said interaction region;

(b) an output region located downstream of and in communication with said interaction region;

(c) said output region having walls diverging outwardly from its upstream to its downstream region;

(d) a pair of ports extending into said walls of output region at opposed locations relative to the axis of said power nozzle;

(e) a pair of passages each extending from a different one of said ports to a different one of said control passages;

(f) said output region opening at its downstream end into a gaseous region;

(g) means directing said fluid stream across the one of said ports connected to said control passages opposite the sidewall to which the fluid stream is attached;

(h) the stream of fluid sealing the port across which it is directed to prevent flow of gas thereinto whereby the volume of fluid entering said last mentioned port is less than the volume of fluid entering the other of said ports.

22. A gas-liquid oscillator comprising:

(a) a power nozzle for issuing a power stream of liquid;

(b) an output region having walls diverging outwardly from an upstream to a downstream region;

(c) an interaction region lying between said nozzle and said output region;

(d) a pair of control passages entering from opposite sides of said interaction region adjacent said power nozzle;

(e) a pair of feedback channels each extending from a different wall of said output region to a different one of said control passages;

(f) said output region opening into a gaseous region at its downstream end and having a centrally located body defining with said walls a pair of discrete output passages; and (g) means for directing fluid of said stream from said interaction region to said output region;

(i) such that the stream of fluid selectively flows over the entry of only one and then the other of said walls of said output region to permit liquid to be entrained into one and then the other respectively of said pair of feedback passages; and (ii) such that gas only is entrained into said other and then said one of said pair of feedback channels respectively.

*23. Liquid-issuing apparatus, comprising:*

*a body member arranged to receive pressurized liquid;*

*first and second alternatively active flow paths, said first flow path including a fluidic oscillator for issuing said received pressurized liquid from said body member in a periodically varying flow pattern, said second flow path being arranged to issue said received pressurized liquid from said body member in a steady flow pattern; and*

*actuable means for selectively activating said flow paths.*

*24. The apparatus according to claim 23 wherein said first and second flow paths each have at least one portion thereof in common.*

*25. The apparatus according to claim 23 wherein said fluidic oscillator comprises:*

*a power nozzle for issuing a power stream of liquid;*

*an output region having walls diverging outwardly from an upstream to a downstream region;*

*an interaction region lying between said nozzle and said output region;*

*a pair of control passages entering from opposite sides of said interaction region adjacent said power nozzle;*

*a pair of of feedback channels each extending from a different wall of said output region to a different one of said control passages; and*

*means for directing fluid of said stream from said interaction region to said output region such that the stream of fluid flows selectively over one and the other of said walls of said output region to seal the entry of first one and then the other of said feedback passages into said output region against entry of gas thereinto;*

*said output region opening into a gaseous region at its downstream end and having a centrally located body defining with said walls a pair of discrete output passages.*

*26. The apparatus according to claim 23:*

*wherein said body member is a shower head having a pair of adjacent outlet openings surrounded by a plurality of spray element outlets arranged in a closed path about said adjacent outlet openings;*

*wherein said fluidic oscillator is of the type which responds to application of pressurized fluid thereto by issuing a continuously oscillating stream of fluid, said fluidic oscillator including first and second output passages for receiving said oscillating stream during respective first and second positions of the stream in its oscillation cycle;*

*wherein said first flow path includes first and second flow passages, each connecting a respective oscillator output passage to a respective one of said pair of adjacent outlet openings in said shower head;*

*wherein said second flow path includes a further flow passage for conducting pressurized liquid received by*

*said shower head to said plurality of spray element outlets; and*

*wherein said actuable means comprises selectively actuable flow diverting means for applying pressurized liquid received by said shower head alternatively to said fluidic oscillator and said further flow passage.*

*27. The apparatus according to claim 23:*

*wherein said body member includes at least one outlet opening and further outlet means;*

*wherein said fluidic oscillator is of the type which responds to application of pressurized fluid thereto by issuing a continuously oscillating stream of fluid, said fluidic oscillator including at least one outlet passage for receiving said oscillating stream during a portion of its oscillation cycle;*

*wherein said first flow path includes a fluid passage arranged to conduct fluid from said oscillator output passage to said one outlet opening in said body member;*

*wherein said second flow path includes a further flow passage for conducting pressurized liquid received by said body member to said further outlet means of said body member; and*

*wherein said actuable means comprises selectively actuable flow diverting means for applying pressurized liquid received by said body member alternatively to said fluidic oscillator and said further flow passage.*

*28. The apparatus according to claim 23:*

*wherein said fluidic oscillator is arranged to receive all pressurized liquid received by said body member;*

*wherein said actuable means comprises a control member manually actuable to first and second positions;*

*said actuable means additionally including further means responsive to said control member in said first position for activating said fluidic oscillator to issue said periodically varying flow pattern from said body member, said further means also being responsive to said control member in said second position for directing outflow from said oscillator to issue from said body member in said steady flow pattern.*

*29. Liquid-issuing apparatus comprising:*

*a body member arranged to receive pressurized liquid and having first and second alternatively conductive flow paths for said pressurized liquid extending therethrough;*

*first egress means defined in said body member and terminating said first flow path for directing flow of pressurized liquid from said first flow path away from said body member, said first egress means including first and second discrete outlet openings;*

*second egress means defined in said body member and terminating said second flow path for directing flow of pressurized liquid from said second flow path away from said body member;*

*actuable means for selectively rendering said flow paths conductive;*

*wherein said first flow path includes oscillatory means for repetitively alternating conduction of said pressurized liquid through said first flow path to said first and second outlet openings of said first egress means such that the flow pattern directed away from said body member by said first egress means is in the form of slugs of liquid issuing alternately from said first and second outlet openings; and*

*wherein said second flow path conducts said pressurized liquid through said body member to said second egress means such that flow of said pressurized liquid, as directed away from said body member by said second egress means, has a steady flow pattern.*

References Cited

The following references, cited by the Examiner, are of record in the patented file of this patent or the original patent.

UNITED STATES PATENTS

| | | | |
|---|---|---|---|
| 2,726,120 | 12/1955 | Bletcher et al. | 239—449 |
| 3,473,736 | 10/1969 | Heitzman | 239—102 X |
| 3,247,861 | 4/1966 | Bauer | 137—81.5 |
| 3,432,102 | 3/1969 | Turner et al. | 239—242 |
| 3,568,716 | 3/1971 | Heitzman | 239—383 X |

M. HENSON WOOD, Jr., Primary Examiner

M. Y. MAR, Assistant Examiner

U.S. Cl. X.R.

137—81.5; 239—456